July 7, 1936.  M. RAUSCH  2,046,426
SHEAF GATHERER FOR MOWING AND BINDING MACHINES
Filed April 27, 1934 2 Sheets-Sheet 1
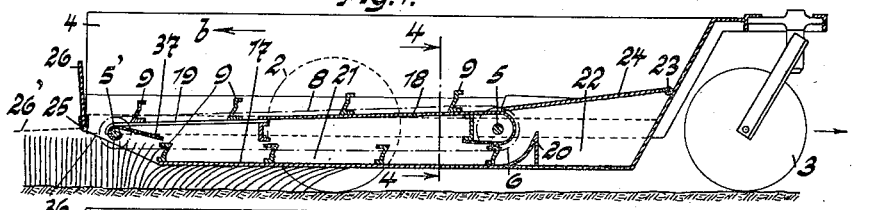
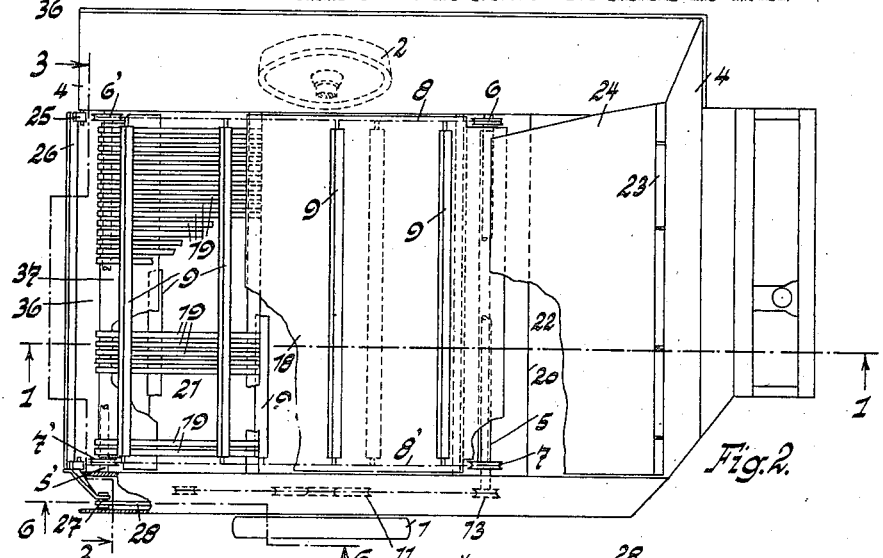
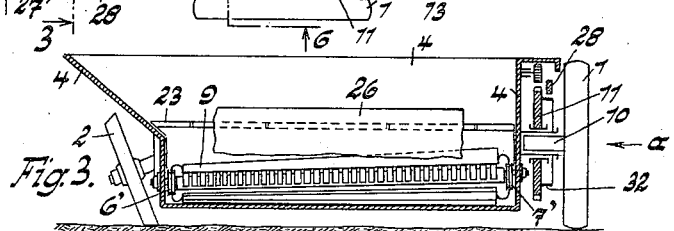
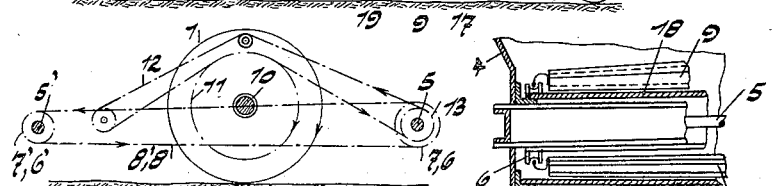

July 7, 1936.     M. RAUSCH     2,046,426
SHEAF GATHERER FOR MOWING AND BINDING MACHINES
Filed April 27, 1934     2 Sheets-Sheet 2
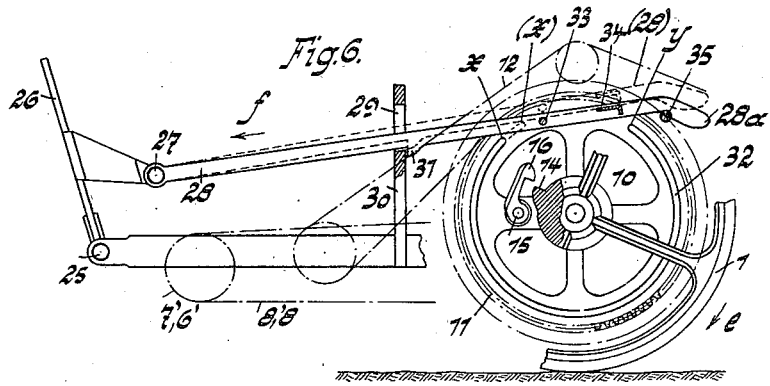
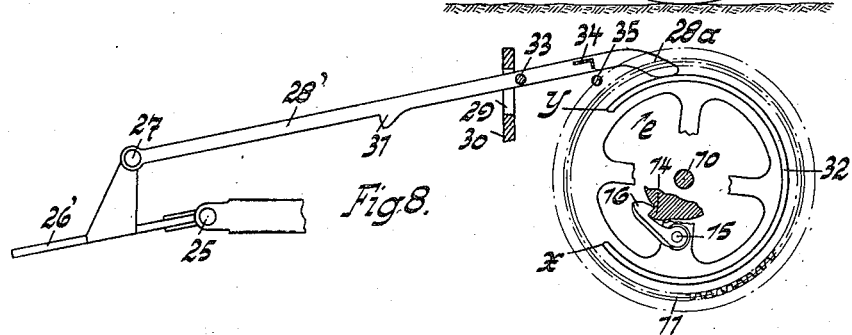
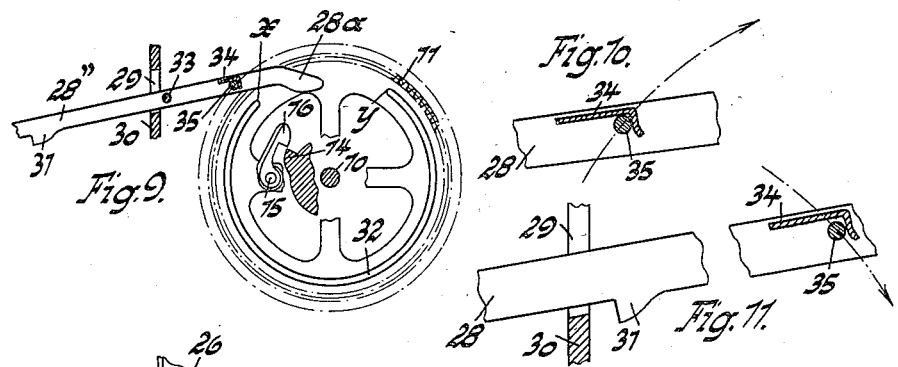
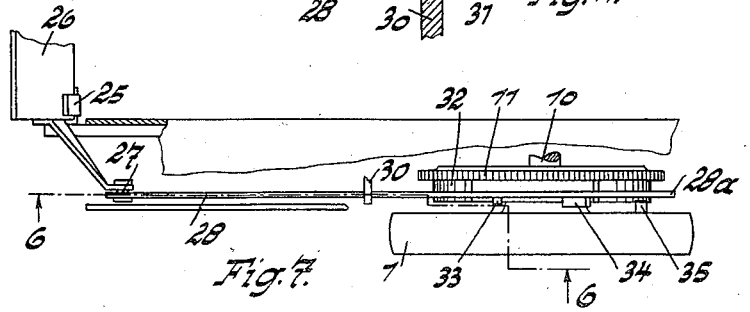

Patented July 7, 1936

2,046,426

UNITED STATES PATENT OFFICE 2,046,426

SHEAF GATHERER FOR MOWING AND BINDING MACHINES

Martin Rausch, Striegau, Germany

Application April 27, 1934, Serial No. 722,742
In Germany May 2, 1933

10 Claims. (Cl. 56—477)

This invention relates to a sheaf gatherer for mowing and binding machines with endless conveyor grid to be intermittently actuated by the operator and automatically coming to a standstill and with a receptacle situated thereunder. The conveyor grid is intended to gather the sheaves coming from the mowing and binding machine and to periodically deposit them on the field, whereas the container is intended for catching the grains and any weed seeds.

A primary condition in the case of such sheafgatherers is to carefully treat the corn or the sheaves so as to prevent as far as possible the separation of the grains from the ears; the fewer grains are separated the fewer grains have to be caught and the less is the danger of the grains dropping on to the field and becoming lost. As the separation of the grains can never be entirely prevented, it is also important that, in order to avoid loss of grain as much as possible, all separated grains are caught and the catching receptacle, in order to avoid the necessity of emptying too often, should only catch the grains but not also pieces of stalks and leaves.

The sheaf gatherer according to the invention meets all these requirements.

A separation of the grains from the ears takes place owing to the fact that, during the movement imparted to the sheaves by the conveyor grid, the ears rub one against the other and, as they often hang from the cover wall of the catching receptacle provided with apertures for the passage of the grains, they also brush against this wall in passing thereover. However, this cause for the separation of the grain from the ears can scarcely be reliably avoided, consequently quite apart from facilitating the work of the operator, it is advisable to make the sheaf gatherer capable of accommodating a higher heap of sheaves than is generally customary, so that its conveyor grid need not be operated so often. An enlargement of the charging space of the conveyor grid in upward direction is, however, not possible owing to the predetermined height of the depositing device of the mowing and binding machine above the ground and can therefore only be attained by lowering the conveyor grid. However, this enlargement of the charging space would result in a reduction of the height of the receptacle situated below the conveyor grid, the capacity of which receptacle, as the clearance between its bottom and the ground must not be less than a certain minimum, is reduced to an undesirable extent so that the receptacle requires to be emptied more often. Consequently, an expedient has been found by the invention in that in the sheafgatherer the receptacle situated under the conveyor grid serves only for catching the grains, whereas for collecting same a separate receptacle is provided over which the conveyor grid does not travel. The arrangement is preferably such, that the catches of the returning portion of the conveyor grid slide in known manner over the bottom of the catching receptacle and thus push the grains therein into the collecting receptacle situated in the direction of movement.

In order during the movement imparted to the sheaves by the conveyor grid to prevent rubbing of the sheaf-ears when brushing over the cover wall of the catching receptacle provided with apertures for the passage of the grains, the sheaf gatherer according to the invention is further so constructed that the cover wall of the receptacle serving for catching the grains is constructed as grate with longitudinally directed bars.

A separation of grains may also be caused by the fact that the mowing and binding machine deposits another sheaf on the conveyor grid after it has already been set in motion. In this case it may happen, that this sheaf is not deposited on to the field by the remaining movement of the conveyor grid but, when the conveyor grid again comes to a standstill, this sheaf remains on the rear end of the conveyor and during the travel of the sheaf gatherer this sheaf is then caused to rock by the shaking movement of the gatherer and consequently comes into such a position that its ears overhang on the field. The stubbles on the field then tear out of the overhanging ears the grains which remain on the field and are consequently lost. This objection is overcome by the sheaf gatherer according to the invention in that its downwardly foldable and controlled closing wall on its rear end is connected with the control mechanism of the conveyor grid in such a manner that this wall is simultaneously and automatically lowered when the conveyor grid is started up but is again raised only if a certain time has elapsed after the conveyor grid has again come to a standstill. During this time any sheaf which has remained on the conveyor grid has been caused to overhang on to the field, but is immediately raised again by the closing wall returning into its initial position.

Another circumstance leads to a separation and possibly also to a loss of grains. The sheaves pass from the mowing and binding machine on to the longitudinal (inner) side of the conveyor grid adjacent the machine. They are, however, not always deposited by the mowing and binding machine axially-parallel to the longitudinal direction of the sheaf-gatherer but often at an angle to this direction and to one another, so that they often do not lie side by side but partly overlap and then do not bear on the conveyor grid along their entire length but only at certain points thereof. The result is, that during the depositing of the stacks of sheaves the speed of the conveyor grid is only incompletely transmitted to the sheaves lying on the inner longitudinal side of the conveyor grid. The conditions are, however, different in the case of the sheaves on the (outer) longitudinal side of the conveyor grid remote from the mowing and binding machine. The sheaves can only come on to this longitudinal side owing to the fact that they roll over the sheaves already situated on the inner longitudinal side. However, practical experience has shown that they then adjust themselves so that their longitudinal axis coincides with the longitudinal direction of the conveyor grid, so that they finally rest with their entire length on this grid, and that, consequently, the speed of the conveyor grid is completely transmitted to these sheaves. Therefore, during the depositing of the stack of sheaves on the field the sheaves situated on the outer longitudinal side of the conveyor grid tend to move ahead of those on the inner longitudinal side, thus, however, allowing no rubbing between the individual sheaves. Owing to the irregular speed transmission to the sheaves the whole stack of sheaves turns during the depositing more or less about a perpendicular axis in such a manner that the sheaves are deposited on the field at an angle to the travelling direction of the sheaf gatherer with the ears towards the mowing and binding machine. If then, during the next operation, the mowing and binding machine and the sheaf gatherer are moved a distance of one working width, the ears lie in the track of the running wheel situated on the outer longitudinal side of the sheaf gatherer, this wheel, when running thereover, separating the grain from the ears in considerably damaging the same. This objection is avoided by the sheaf gatherer according to the invention in that the conveying surface of the conveyor grid is inclined in transverse direction from the inner to the outer longitudinal side of the sheaf gatherer so that the first sheaves deposited by the mowing and binding machine on to the conveyor grid slide from the inner to the outer side thereof. For the better transmission of the conveying speed on to the sheaves on the inner longitudinal side of the conveyor grid the catches of the conveyor grid in the sheaf-carrier according to the invention are higher on the inner side thereof than on the other longitudinal side so that they penetrate more deeply into the bundle of stalks of the sheaves and thus grip them better.

Finally, the danger of separation of grains from the ears is due to the following circumstance. If, owing to carelessness on the part of the operator, the sheaf gatherer is loaded too high, the depositors of the mowing and binding machine press on the sheaves from above and, when the conveyor grid is set in motion and the sheaves are to be conveyed, these depositors exert a braking effect thereon. Consequently, a longitudinal shifting of the upper sheaves relative to the sheaves situated thereunder takes place with the result that the ears of the upper sheaves rub against the lower sheaves, so that grains may be separated from the ears. Consequently, the conveying surface of the conveyor grid in the sheaf-gatherer according to the invention is also inclined in the longitudinal direction of the sheaf gatherer from the front towards the rear in order to reduce the braking effect.

Finally, a device is provided on the sheaf gatherer according to the invention intended to prevent the stalk parts, leaves and the like from entering the grain catcher. This arrangement will be hereinafter explained.

An embodiment of the invention is illustrated by way of example in the accompanying drawings in which:—

Fig. 1 is a longitudinal section through the sheaf gatherer, taken on line 1—1 of Fig. 2.

Fig. 2 shows the sheaf gatherer in top plan view.

Fig. 3 is a cross-section on line 3—3 of Fig. 2.

Fig. 4 is a cross-section on line 4—4 of Fig. 1.

Fig. 5 is a diagrammatic view showing the conveyor grid drive in elevation viewed in the direction of the arrow $a$ Fig. 3.

Fig. 6 is an enlarged longitudinal section on line 6—6 of Figs. 2 and 7.

Fig. 7 is a top plan view of Fig. 6.

Figs. 8 and 9 are similar longitudinal sections to Figure 6 with the individual parts in different positions.

Figs. 10 and 11 show details on a considerably larger scale as compared with the other figures.

The sheaf-gatherer is intended to be hitched in the usual way to a mowing and binding machine which deposits the sheaves on the conveyor grid of the sheaf gatherer. From time to time the operator of the mowing and binding machine sets in motion the conveyor grid from his seat, so that the sheaves which have in the meantime collected thereon are deposited on the field. After depositing the sheaves, the conveyor grid automatically comes to a standstill.

The sheaf gatherer comprises a box 4, which is supported by the two running wheels 1, 2 and by a front supporting wheel 3. A transverse shaft 5 and a transverse axle 5' parallel thereto are mounted in the longitudinal walls of the box. On the ends of the shaft 5 sprocket wheels 6, 7 are keyed and on the ends of the transverse axle 5' sprocket wheels 6', 7' are loosely mounted. The conveyor grid is formed by transverse bars 9 which are fixed on chains 8, 8' running on the sprocket wheels 6, 6' and 7, 7' respectively. A sprocket wheel 11 (Figs. 5–7) is loosely mounted on an axle 10 (Fig. 3) of the running wheel 1 and rotated by being coupled with the running wheel 1, it imparting then a rotary movement to a sprocket wheel 13 on the shaft 5 through the intermediary of a chain drive 12. Thus, the conveyor grid 8, 8', 9 is moved in the direction of the arrow $b$ (Fig. 1).

The following arrangement serves for coupling the sprocket wheel 11 with the running wheel 1. A claw 16, rotatable about an axle 15, is mounted on the sprocket wheel 11 (Fig. 6). A spring, not shown in the drawings, tends to move this claw into the path of a nose 14 mounted on the hub of the running wheel, but is prevented from engaging same by a stop (not shown) locking the claw 16. If this stop is shifted by the operator from his seat by means of a rope, the spring brings the claw 16 into the path of the nose 14, thus transmitting the rotary movement of the running wheel to the sprocket wheel 11. A device, which is not herein described in detail, is provided which, when the sprocket wheel 11 has just completed a full rotation, automatically returns the claw 16 into its initial position and again locks the same. In this manner the conveyor grid is also again automatically stopped.

For the reasons mentioned at the outset the conveyor grid is inclined both in the longitudinal direction (Fig. 1) from the front towards the rear and also in the transverse direction from the side of the sheaf gatherer adjacent the mowing and binding machine (right in Fig. 3) to the side remote therefrom (left in Fig. 3). Moreover, as shown in Fig. 3, the transverse bars 9 of the conveyor grid are higher on the end adjacent the mowing and binding machine than those at the other end.

The above mentioned box serves for catching the grains and any weed seeds in its rear portion 21 brushed by the conveyor grid and for collecting these grains and seeds in its front portion 22 which is not brushed by the conveyor grid. The transverse bars 9 of the upper part of the conveyor grid effecting the depositing of the sheaves first move over a sheet metal plate 18 arranged in the box 4 and then over a grate extending therefrom and composed of parallel longitudinally arranged bars 19. The transverse bars convey any separated grains and weed seeds from the sheet metal plate 18, and these grains and seeds, as the transverse bars brush over the grate, then drop between the grate bars on to the box bottom 17 (Fig. 1) together with the grains separated on this grate. The transverse bars of the returning portion of the conveyor grid brush this box bottom 17 and push forward the grains and seeds which have fallen on to the box bottom, lift them over a ramp 20 extending concentric to the shaft 5 and over which it brushes, and allow them to drop into the collecting chamber 22 situated behind the ramp and over which the conveyor grid does not brush.

The collecting chamber 22 is closed at the top by a sheet metal plate 24 turnable about a hinge 23. The front end of this plate 24 rests on the above mentioned sheet metal plate 18, is lifted by each passing transverse bar 9 of the conveyor grid and then again drops by gravity. Thus, a gentle shaking movement is imparted to this plate 24 which allows any grains and weed seeds to slide downwards thereon. As the starting up of the conveyor grid only takes place periodically, the noise occasioned by each lifting and dropping of the sheet metal plate 24 is not disturbing. For emptying the collecting chamber 22 the plate 24 is swung upwards.

To ensure that the transverse bars brush against the horizontally arranged box bottom 17 in spite of the inclination of the transverse bars 9 in the transverse direction and in spite of the different heights at the two ends, the shaft 5 and the transverse axle 5' are also inclined in transverse direction.

In order to prevent torn-off pieces of stalks and leaves from entering the collecting chamber 22 the box bottom has, at the place where the lower part of the conveyor grid commences its return movement from the rear towards the front, an aperture 36 extending across the entire width of the box and through which pieces of stalk and leaves conveyed by the transverse bars of the conveyor grid can drop on to the field. The tearing off of such pieces of stalk and leaves is assisted by the stubble on the field which, when the box aperture 36 brushes thereover, so to say brush out the pieces of stalk and leaves. Within the box and above the returning portion of the conveyor grid 8, 8', 9 the aperture 36 is covered by an inclined sheet metal plate 37 which allows any grains falling through the grate 19 to slide on to the box bottom 17.

The rear end of the box 4, when the conveyor grid is at rest, is closed by a controlled wall 26 rotatable about the axle 25 into the position 26' (Fig. 4), this wall, when the conveyor grid is set in motion, being automatically swung down into the position 26' and again raised, also automatically, after the conveyor grid has been at rest for a certain short time.

In order to attain this effect, a rod 28 is connected with the wall 26 by means of a link 27 (Figs. 6 and 8), said rod extending through an aperture 29 in a support 30 fixed on the outer side of the box and bent slightly downwardly at its front end 28a. The wall 26 is locked in its raised or inoperative position by a nose 31 provided on the under side of the rod 28 and engaging in front of the lower edge of the aperture 29 of the support 30. The rod in this position covers the gap extending from x to y in a cylindrical guide race 32 fixed on the sprocket wheel 11. If, when starting up the conveyor grid, the sprocket wheel 11 commences to rotate in the direction e (Fig. 6), the end x of the guide surface gradually raises the rod until, when the end x has reached the position (x), the rod assumes the position (28) shown in dotted lines and the nose 31 is raised above the lower edge of the aperture 29 in the bracket 30. The wall 26 then drops by gravity into the position 26' (Fig. 8) and pulls the rod 28 in the direction of the arrow f (Fig. 6) into the position 28'. The oscillation of the wall is limited by a pin 33, mounted on the rod 28, coming in front of the bracket 30 and thus preventing the further displacement of the rod. During the continued rotation of the sprocket wheel 11 the rod end 28a bears against the guide race 32 and this race again influences the rod 28 only when its end y has left the rod end. Then, the rod end 28a drops into the gap x—y in the guide race, bringing the rod into the position 28'' (Fig. 9). When the guide race has returned into its initial position shown in full lines in Fig. 6, the sprocket wheel 11, which according to the former constructions only carried out a single complete rotation, again stops together with the guide race 32. Shortly afterwards the rod and the wall 26 are automatically returned into their initial positions in the following manner:—

An angle-shaped abutment 34 is provided on the rod 28, and a roller-shaped catch 35 mounted on the running wheel 1 so that it rotates therewith. When the rod is in the position 28' corresponding to the lowermost position of the wall 26 and shown in Fig. 8, the catch 35 travels past the under side of the abutment 34 so that the rod remains uninfluenced. This takes place before the sprocket wheel has completed a full revolution and consequently before the rod 28 has reached the position 28'' shown in Fig. 9. The sprocket wheel thus comes to a standstill together with the conveyor grid, and the rod assumes the position 28'' so that the rod abutment 34 is in the path of the still circulating catch 35, which, in ascending, comes into contact with the abutment 34 and by this abutment, during its upward movement towards the right (Fig. 10), lifts and shifts the rod carrying the abutment so that the wall 26 commences to lower. When, during the further rotation of the running wheel 1, the catch 35 again commences to descend (Fig. 11), the rod is also lowered until its under side bears against the lower edge of the aperture 29 in the above mentioned bracket 30. At this instant the catch 35 disengages from the rod, the nose 31 of which is then situated slightly on the right side of the bracket 30. The wall 26 now pulls the rod 28 by gravity into its initial position towards the left until the nose 31 again bears against the front side of the bracket 30 as shown in Fig. 6. By the lateral shifting of the rod its abutment 34 is again moved out of the path of the catch 35 (Fig. 6) so that this catch can pass the abutment without influencing the rod. Thus, it is apparent that the wall 26 will be raised again from its lowered position only when a certain period of time has elapsed after the stopping of the conveyor grid, this period corresponding substantially to the time required for the catch 35 to rotate through an angle of about 270°.

I claim:—

1. In a large sheaf gatherer for mowing and binding machines with known endless conveyor grid for depositing the sheaves and known means adapted to be actuated by the operator for coupling the driving wheel of the conveyor grid with a running wheel of the sheaf gatherer to circulate said conveyor grid, and a known releasing device fitted on the sheaf gatherer and adapted to automatically disengage the coupling between the driving wheel of the conveyor grid and the running wheel of the sheaf gatherer to stop said conveyor grid after the depositing of the sheaves, a receptacle for catching the grain, and a second receptacle separate from said first receptacle for collecting the grain beyond the end of said conveyor grid.

2. In a sheaf gatherer as specified in claim 1, transverse bars on said conveyor grid adapted to brush along the bottom of said catching receptacle during the return movement of said conveyor grid and to push the grains in front of them into said collecting receptacle.

3. In a sheaf gatherer as specified in claim 1, a cover wall constructed as a grate with longitudinally directed bars forming the cover wall of said catching receptacle.

4. In a sheaf gatherer as specified in claim 1, a drive for said conveyor grid, a closing wall hingedly mounted at the rear end of said gatherer, and means controlled by said drive for lowering said wall when said grid is set in motion and raising said wall shortly after said conveyor grid has come to a standstill.

5. In a sheaf gatherer as specified in claim 1, a curved wall separating said catching receptacle from said collecting receptacle, and transverse bars on said conveyor grid adapted to brush along the bottom of said catching receptacle during the return movement of said conveyor grid to push the grains from said catching receptacle over said wall and into said collecting receptacle.

6. In a sheaf gatherer as specified in claim 1, a driving wheel adapted to drive said conveyor grid, a closing wall hingedly mounted on the rear end of the gatherer, a rod connected to said wall, means for locking said rod to maintain said wall in raised position, a cylindrical guide race fixed on said driving wheel and having a gap, said race adapted to lift said rod to disengage said locking means to allow said wall to drop by gravity and axially shift said rod, an abutment on said rod, a catch on said wheel adapted during the rotation of said wheel to engage said abutment return rod into its initial position and raise said wall, and a bent end on the free end of said rod adapted to drop into said gap and re-engage said locking means.

7. In a sheaf gatherer as specified in claim 1, transverse bars on said conveyor grid descending at an incline in transverse direction from the inner to the outer side of the gatherer.

8. In a sheaf gatherer as specified in claim 1, transverse bars on said conveyor grid, said bars being higher on the inner side than on the outer side.

9. In a sheaf gatherer as specified in claim 1, transverse bars on said conveyor grid inclined from the front towards the rear in the longitudinal direction of the gatherer.

10. In a sheaf gatherer as specified in claim 1, the bottom of said catching receptacle having an aperture at its rear end below the lower reversing point of said conveyor grid to allow pieces of stalk and leaves to drop out of said receptacle on to the field, and an inclined wall at the front end of said receptacle beyond the front reversing point of the conveyor grid to facilitate the passage of the grains out of said catching receptacle into said collecting receptacle.

MARTIN RAUSCH.